United States Patent [19]

Parlier et al.

[11] Patent Number: 5,196,235
[45] Date of Patent: Mar. 23, 1993

[54] PROCESS FOR THE PRODUCTION OF A CERAMIC FIBER/MATRIX COMPOSITE MATERIAL

[75] Inventors: Michel Parlier, Voisins Le Bretonneux; Erick Bouillon, Bordeaux; Claude Muller, Verrieres Le Buisson; Bertrand Bloch, Paris; Patrick Noireaux, Le Mans; Jean Jamet, Floirac, all of France

[73] Assignee: Office National D'Etudes et de Recherches Aerospatiales, Chatillon Sous Bagneux, France

[21] Appl. No.: 629,945

[22] Filed: Dec. 19, 1990

[30] Foreign Application Priority Data

Dec. 20, 1989 [FR] France .................... 89 16918

[51] Int. Cl.$^5$ ............................. B05D 7/00
[52] U.S. Cl. ....................... 427/214; 427/228; 427/299; 427/379; 427/397.7; 427/443.2
[58] Field of Search ............... 427/248.1, 214, 228, 427/299, 379, 397.7, 443.2

[56] References Cited

U.S. PATENT DOCUMENTS 4,814,127  3/1989  Toyoda .................... 264/56

FOREIGN PATENT DOCUMENTS 1180169  1/1985  Canada .
123934  11/1984  European Pat. Off. .
130105  1/1985  European Pat. Off. .
2401888  3/1979  France .

OTHER PUBLICATIONS

Chemical Abstracts, vol. 110, No. 6, Mar. 1989, Abstract No. 100541k.
Patent Abstracts of Japan, vol. 102, (JP 1-112523), May 1, 1989.

Primary Examiner—Bernard Pianalto
Attorney, Agent, or Firm—Armstrong, Westerman, Hattori, McLeland & Naughton

[57] ABSTRACT

The matrix is formed by particles of ceramic material which are introduced into the empty spaces of a fibrous structure and are bonded to one another by bridges of ceramic material obtained by in situ pyrolysis of a liquid polymer.

By means of this process, a composite material of low porosity, despite a high reduction in volume during pyrolysis, is obtained relatively rapidly.

16 Claims, 6 Drawing Sheets

PROCESS FOR THE PRODUCTION OF A CERAMIC FIBER/MATRIX COMPOSITE MATERIAL

The invention relates to the production of ceramic composite materials comprising a fibrous structure embedded in a matrix, and more particularly a structure of silicon carbide fibers embedded in a matrix of silicon carbide. The composite materials of this latter type may be used at high temperature, for example as structural elements in heat engines.

A conventional process for producing a ceramic fiber/matrix composite material consists in sintering ceramic particles together in the presence of fibers. This process is currently not applicable to the composite materials in which the fibers and the matrix consist of silicon carbide, hereinafter termed SiC/SiC composites. In fact, the sintering of a silicon carbide powder requires a temperature of the order of 2,000° C., which changes the mechanical properties of the known silicon carbide fibers.

Similarly, the process consisting in pyrolyzing a precursor previously introduced into the empty spaces in the fibrous structure in order to form the matrix material in situ, which process is used in particular for carbon matrices, does not give good results in the case of silicon carbide matrices because of the high theoretical density of this substance (3.2 as against 2.26 for graphite), which gives rise to a high reduction in volume during the pyrolysis of a precursor of the polysilane type and a significant residual empty space relative to the volume of the matrix.

The only process currently used to obtain a silicon carbide matrix is the vapor phase chemical infiltration process, as described in French Patent No. 2,401,888, which comprises a heat treatment at a temperature of only 1,000° to 1,100° C. This process consists in placing the fibrous structure in an atmosphere containing a silicon carbide precursor in the gaseous state, for example methyltrichlorosilane, at a temperature which is slightly higher than the temperature at which the precursor decomposes to form silicon carbide.

The main disadvantage of this technique is that an infiltration period of several hundreds of hours is required to produce a homogeneous material (low thickness gradient of the coating on the fibers between the core and the surface of the fibrous structure) and not to block the surface porosity of the composite material prematurely. Despite the precautions taken, the operation must be interrupted several times to remove the crust from the surface of the composite in order to restore a surface porosity which is sufficient for the gaseous infiltration to continue.

The aim of the invention is to overcome the above-mentioned disadvantages and to provide a process which is much more rapid than the vapor phase chemical infiltration process and is applicable, in particular, to the SiC/SiC composites.

To this end, in the process according to the invention, on the one hand discrete particles of ceramic material and on the other hand a liquid polymer capable of being converted to ceramic material by pyrolysis are introduced into the empty spaces of a silicon carbide fibrous structure and the whole is heated to convert the said polymer and bind the discrete particles to one another by means of the ceramic material thus obtained, forming a continuous matrix.

The supply of ceramic material by the decomposition of the liquid precursor ensures bonding between the discrete particles and consequently the continuity of the matrix, without it being necessary to bring the material to the sintering temperature of these particles. Moreover, as the main part of the volume of the matrix is represented by the discrete particles, the reduction in volume which accompanies the thermal decomposition of the liquid substance does not produce excessive residual empty spaces.

According to one embodiment of the invention, a suspension of particles of ceramic material in a liquid carrier is passed through the previously established fibrous structure until the desired volume of particles has been introduced into the empty spaces of the structure, the liquid carrier present in said empty spaces is removed and the liquid substance is then introduced into the volume left free by the particles. Advantageously, during the passage of the suspension, the fibrous structure is placed on a filter which retains the particles of ceramic material. Preferably, the diameter of the pores of the filter is of the same order as the median volume diameter of the powder, which can be about 1 micrometer.

With regard to the liquid substance, this is advantageously introduced by immersion of the fibrous structure provided with ceramic particles into a bath of said substance.

This embodiment applies in particular to a fibrous structure comprising long fibers extending continuously in at least one direction, in particular to a fabric of fibers which may be unidirectional, bidirectional or tridirectional.

For the production of a composite material having a silicon carbide matrix, the invention provides for the use of a polysilane in the liquid state as liquid precursor.

Very advantageously, the polysilane used is as described in French Patent Application filed on 23rd January 1989, under No. 89 00764, in the names of the Applicant and the Institut de Recherche Appliquée sur les Polymères (Institute for Applied Polymer Research), to which express reference is made for further information, which polysilane has all or some of the following characteristics:

It comprises ethylene groups and hydrogen atoms bonded to silicon atoms, which permit crosslinking without loss of mass, facilitating the subsequent conversion to silicon carbide.

The polysilane is a copolymer obtained by reacting two monomers having, respectively, the following formulae:

$$R(CR'_2=CR')SiX_2 \quad (I)$$

$$RHSiX_2 \quad (II)$$

in which formulae the symbols R represent identical or different hydrocarbon radicals, the symbols X represent identical or different halogen atoms and the symbols R' each represent a hydrogen atom or a hydrocarbon radical, and at least one monohalogenated monomer with sodium, the ratio $r_1$ of the number of moles of the monomer (I) to the number of moles of the monomer (II) being between 2 and 3.3 approximately, and the ratio $r_2$ of the number of moles of the monohalogenated monomer to the number of moles of the monomers (I) and (II) being between 0.2 and 0.8 approximately.

The monomers used and their molar fractions are as follows:

| | |
|---|---|
| $CH_3(CH_2=CH)SiCl_2$ | 0.76 |
| $CH_3HSiCl_2$ | 0.24 |
| $(CH_3)_3SiCl$ | 0.40 |

The polysilane has a viscosity of less than about 20 poise at ordinary temperature and less than about 1 poise at 100° C.

In the case of a SiC/SiC composite, the invention provides for subjecting the fibers, before they are brought into contact with the silicon carbide particles and with the liquid polysilane, to a treatment limiting the physicochemical interactions between the fibers and the matrix. In the absence of such a treatment, in particular a strong chemical interdiffusion between the fiber and the matrix is promoted, which may lead on the one hand to a weakening of the mechanical properties of the fiber and on the other hand to an intensive bonding which does not allow relative movement between the fibers and the matrix. In this case, the reinforcing effect of the fiber does not exist because, in the case of cracks in the matrix, the fiber breaks in the cracking plane, which leads to a purely brittle fracture. In order to play its reinforcing role, the fiber must retain its chemical properties intact and be able to deflect a matrix crack, leading to a non-brittle mechanical behavior.

This treatment may be a deposition of an intercalary material having anisotropic internal cohesion. In particular, carbon gives good results in this respect. Boron nitride, the crystallographic structure of which is comparable to that of graphite, may also be suitable.

The invention also provides for subjecting the silicon carbide particles present in the fibrous structure, before introduction of the liquid polysilane, to a treatment which improves their wettability by the latter and thus enables good impregnation of the finest pores. This treatment may consist in removing the hydroxyl groups present at the surface of the particles by the action of a monohalogenated monosilane in the gaseous state.

Other characteristics and advantages of the invention will become apparent from the detailed description of several illustrative embodiments given below and from the appended drawings, in which:

Figure 1:
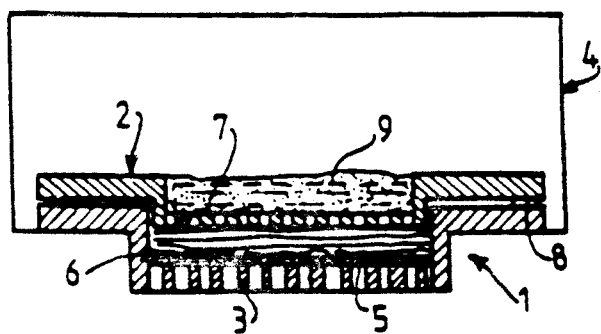
FIGS. 1, 2 and 3 show diagrammatically devices which can be used for carrying out three respective successive stages of the process according to the invention.

The starting materials, the equipment and the operating methods used in the various examples are first described.

The procedure used for the production of a SiC/SiC composite starting from a fabric of fibers may be broken down into six successive stages:

First stage

Preparation of the fibrous structure, including cutting and cleaning of the fibers.

Second stage

Deposition of a layer of carbon on the fibers by vapor phase chemical infiltration.

Third stage

Introduction of the ceramic powder into the fibrous structure from a suspension in a liquid or slip.

Fourth stage

Chemical treatment of the surface of the powder by gas phase exchange reaction, in order to improve its wettability.

Fifth stage

Impregnation by the liquid polysilane.

Sixth stage

Heat treatment for crosslinking and pyrolysis of the polysilane.

These various stages, as described in detail below, may be modified or replaced by different treatments to adapt the process to other types of fiber/matrix composite materials.

Silicon carbide fibers produced by NIPPON CARBON under the reference NICALON NLM202, which have a mean diameter of 13 micrometers and are in the form of filaments containing 500 fibers, were used in the examples. Unidirectional fibrous structures formed from such filaments cut and aligned parallel to one another were produced. Bidirectional and tridirectional fabrics formed from the same filaments oriented in two or three orthogonal directions and marketed by BROCHIER under the references 2D-E2140 and 3D-E2319 were also used.

The above three-dimensional fabric comprises a binding filament based on lactose, which was removed, in the first stage of the procedure, by dissolving in water at 80° C., with stirring. Moreover, all of the fibers comprise an oiling based on acrylic resin, which is removed by immersion in an equivolume mixture of acetone and isopropyl alcohol stirred intermittently using an ultrasonic tank.

It is also possible to use as starting material a "pseudo-unidirectional" fabric comprising a minority fraction of binding fibers or filaments oriented transversely to the main direction of the fibers. If these binding filaments are made of a foreign substance, these may also be removed during the first stage.

The second stage uses, as precursor, a gaseous aliphatic hydrocarbon chosen from $C_1$ to $C_4$ saturated hydrocarbons and $C_2$ to $C_4$ ethylenic hydrocarbons. Ethylene was chosen, which makes it possible to obtain, by an infiltration treatment at 1,000° C. under 4,000 Pa, a carbon deposit having a uniform thickness of between 200 and 300 nanometers throughout the volume of the three-dimensional fabric which has a thickness of about 7 mm. The treatment time in order to obtain this thickness depends on the developed surface area of the fibers. By way of example, it is 70 min for a developed surface area of fabric of 45,000 $cm^2$, arranged in a chamber having a radiant surface area of 1,500 cm$^2$, the ethylene flow rate being 200 cm$^3$ per minute brought back to normal temperature and pressure conditions.

The silicon carbide powder used is supplied by STARCK under the reference B10. Its median volume diameter is about 1 micrometer, that is to say the particles having a diameter larger than this value represent half of the actual volume of the powder. This powder is used in the form of a suspension in water or in acetone having a concentration of 200 g/liter.

It is generally desired that the porosity of the final composite material is very low. It is then advantageous that the apparent density $d_c$ of the ceramic powder in the fibrous structure, that is to say the ratio between the mass of the powder and the volume left free by the fibrous structure, including that occupied by the powder, is as high as possible. The filling efficiency may be expressed by the ratio $\eta = d_c/d_p$ between this apparent density $d_c$ and the apparent density of a mass of powder obtained under the same filtration conditions but in the absence of fibrous structure. Several parameters act on $\eta$ and on $d_c$: the particle size distribution of the powder relative to the average diameter $d_f$ of the fibers, the texture of the fabric, the shape of the particles, the type of interaction in the slip and, finally, the porosity of the filtering system. More particularly, the median diameter $d_{50}$ of the powder must preferably be such that $10 \leq d_f/d_{50} \leq 30$. An ideal powder formed of spherical particles of uniform diameter would enable a maximum apparent density to be achieved which is in a ratio of 0.74 to the theoretical density of the material, that is to say the density of the perfect crystal. In practice, for particles of irregular shape and non-uniform size, this ratio is between 0.5 and 0.63, the higher values being obtained by filtration using a homogeneous stable suspension in a liquid serving as lubricant. The stability and the homogeneity of the slip are determined by the resultant of the interparticulate forces, which are the Van der Waals attraction forces and the electrostatic repulsion and steric hindrance forces. In an aqueous medium, control of the repulsion forces may be achieved by acting on the surface electric potential of the particles (zeta potential), which is determined by the double electric layer formed, on the one hand, by the ions absorbed at the surface and, on the other hand, by mobile ions distributed diffusely and which, in its turn, determines the extent of the electrostatic repulsion. By adjusting the pH of the medium, it is possible to achieve a repulsive zeta potential of a few tens of millivolts. In an organic medium, stability can be obtained by modifying the steric hindrance of the particles by grafting short chain polymers, which are soluble in the medium, at their surface. With regard to the filtering system, its pores advantageously have a diameter of the same order as $d_{50}$.

In the examples, the aqueous suspension was brought to pH 9 (zeta potential $-60$ millivolts) by adding ammonia. The acetone suspension was stabilized using a polymer supplied by IMPERIAL CHEMICAL INDUSTRIES under the reference KD1, used in an amount of 3% by mass relative to the powder. The apparent density $d_p$ is 1.55 and 2.05 using these two slips respectively.

DETAILED DESCRIPTION OF THE DRAWINGS

The filtration device used is shown diagrammatically in FIG. 1. It comprises a mold formed from a lower part 1 and an upper part 2, the part 1 defining a cavity limited towards the bottom by a perforated base 3. The part 1 of the mold, including the base 3, forms a portion of the wall of a leaktight chamber 4. The base 3 is covered by a plate of sintered silica 5 having pores 90 to 150 micrometers in size, on which plate a glass fiber filter having 0.7 micrometer orifices, supplied by WHATMAN under the reference GF/F, is placed in its turn. The fibrous structure 6 rests on the filter and is covered by a second perforated grating 7 belonging to the part 2 of the mold and limiting the cavity of said mold towards the top. In the case of a unidirectional or bidirectional fibrous structure, the fibers are arranged horizontally and the height of the structure, and consequently the proportion by volume of fibers in the final product, for a given quantity of fibers, are controlled by means of blocks 8 interposed between the parts 1 and 2.

In the examples comprising a unidirectional fibrous structure, about 15 g of aligned fibers having a length of 6.6 cm (length of the rectangular mold, its width being 4 cm) are arranged on the filter and the height of the mold is adjusted to 5 mm, which corresponds to a volume fraction of about 45% for a mass per unit volume of the fibers of 2.55 g/cm$^3$. To obtain a bidirectional fibrous structure, 15 folds or sheets of fabric cut to the dimensions of the mold are stacked. The proportion of fibers by volume is 30%, the fibers being oriented with half of the volume in each of the two orthogonal directions of the plane of the fabric. Finally, the three-directional fabric, the thickness of which is about 7 mm, has a proportion of fibers by volume about 45%, about 20% of the fibers being oriented in each of the two horizontal orthogonal directions and 5% being oriented in the vertical direction.

The filtration is effected by pouring the slip 9 onto the grating 7 and applying a gas pressure of 0.5 to 1.5 MPa in the chamber 4, and applying vacuum below the base 3, the pressure being limited by the saturating vapor pressure of the liquid phase of the slip.

Figure 2:
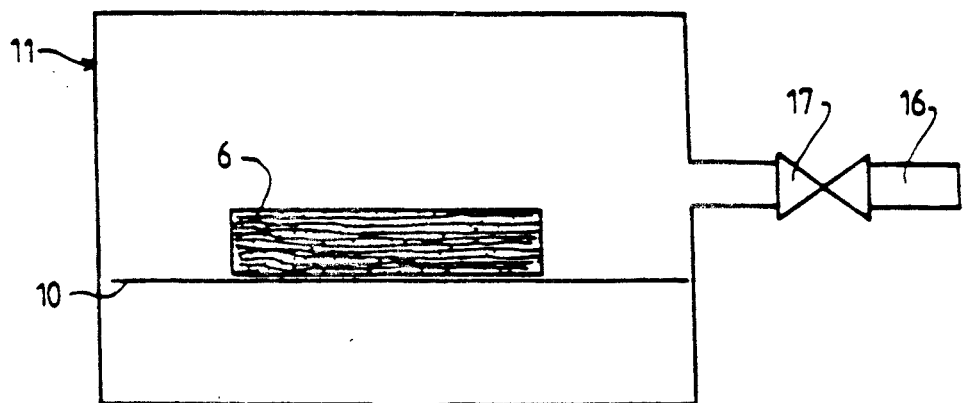

The fourth stage uses the device shown diagrammatically in FIG. 2. The fibrous structure 6 provided with silicon carbide particles is placed on a grating 10 in a chamber 11. This chamber is in communication with a reservoir 12 containing 7 ml of trimethylchlorosilane 13. The reservoir 12 is immersed in liquid nitrogen 14 contained in a Dewar vessel 15. Vacuum is applied in the chamber 11 by means of a pipe 16 and the chamber is kept under a pressure not exceeding 5 Pa for 4 hours, after which the chamber is isolated by closing a valve 17 mounted on the pipe 16. The vessel 15 is then withdrawn and the trimethylchlorosilane, the boiling point of which at atmospheric pressure is 57.3° C., evaporates progressively and passes into the chamber 11. The structure 6 is left in contact with this gas for at least 24 hours. Said gas reacts with the hydroxyl groups present at the surface of the silicon carbide particles in accordance with the following exchange reaction:

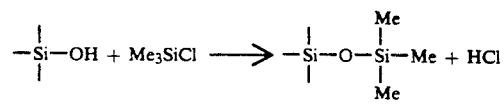

This reaction eliminates the Si-OH bonds, which are sites suitable for linking hydrogenosilane functions of the liquid polysilane which will be introduced in the fifth stage, and consequently are prejudicial to a complete impregnation. This treatment is also applicable to other powders of silicon compounds capable of having Si-OH bonds at the surface, in particular silicon nitride $Si_3N_4$.

The liquid polysilane used for the impregnation is obtained by the process described in the abovementioned Patent Application No. 89,00764, starting from 76 mol % of methylvinyldichlorosilane, 24 mol % of methyldichlorosilane and 40 mol % of trimethylchlorosilane.

Figure 3:
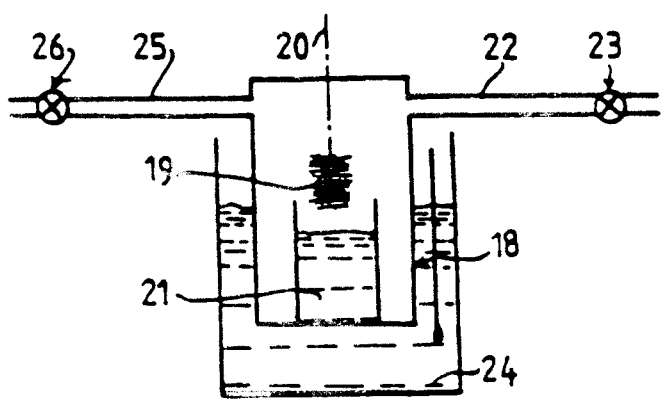

The impregnation equipment, illustrated in FIG. 3, comprises an autoclave 18, inside which the sample 19 is suspended from a movable rod 20 and which contains a reservoir of polysilane 21.

Figure 4:
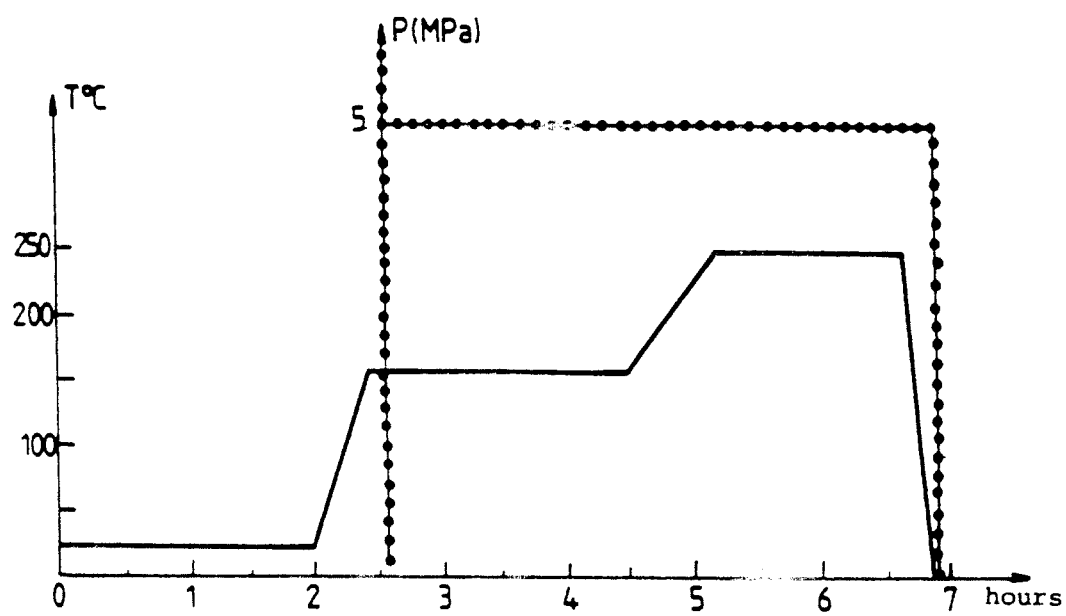
FIG. 4 is a diagram showing the variation in the temperature and in the pressure as a function of time during one of these stages.
Figure 5:
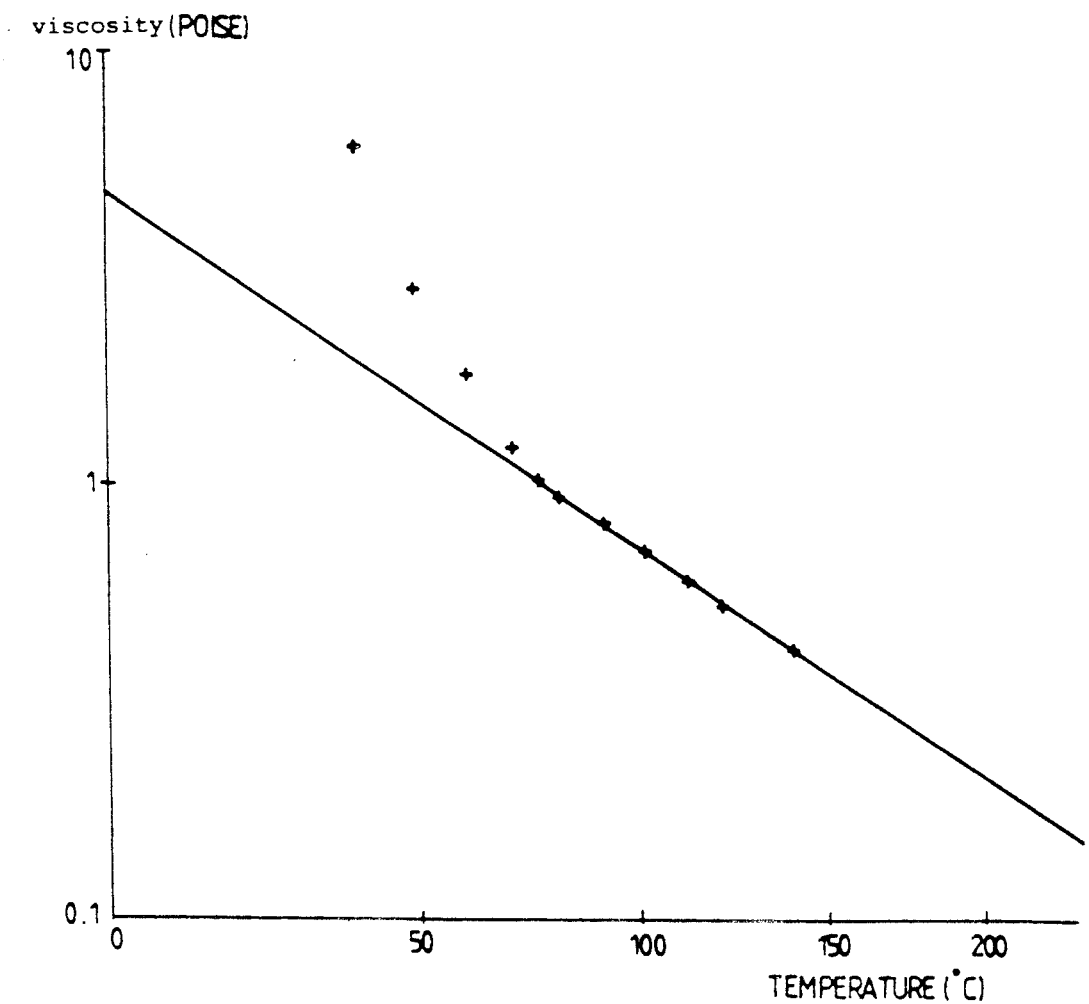
FIGS. 5 and 6 are diagram showing, respectively, the variations in the viscosity and in the gel time of a liquid polysilane as a function of the temperature.
Figure 6:
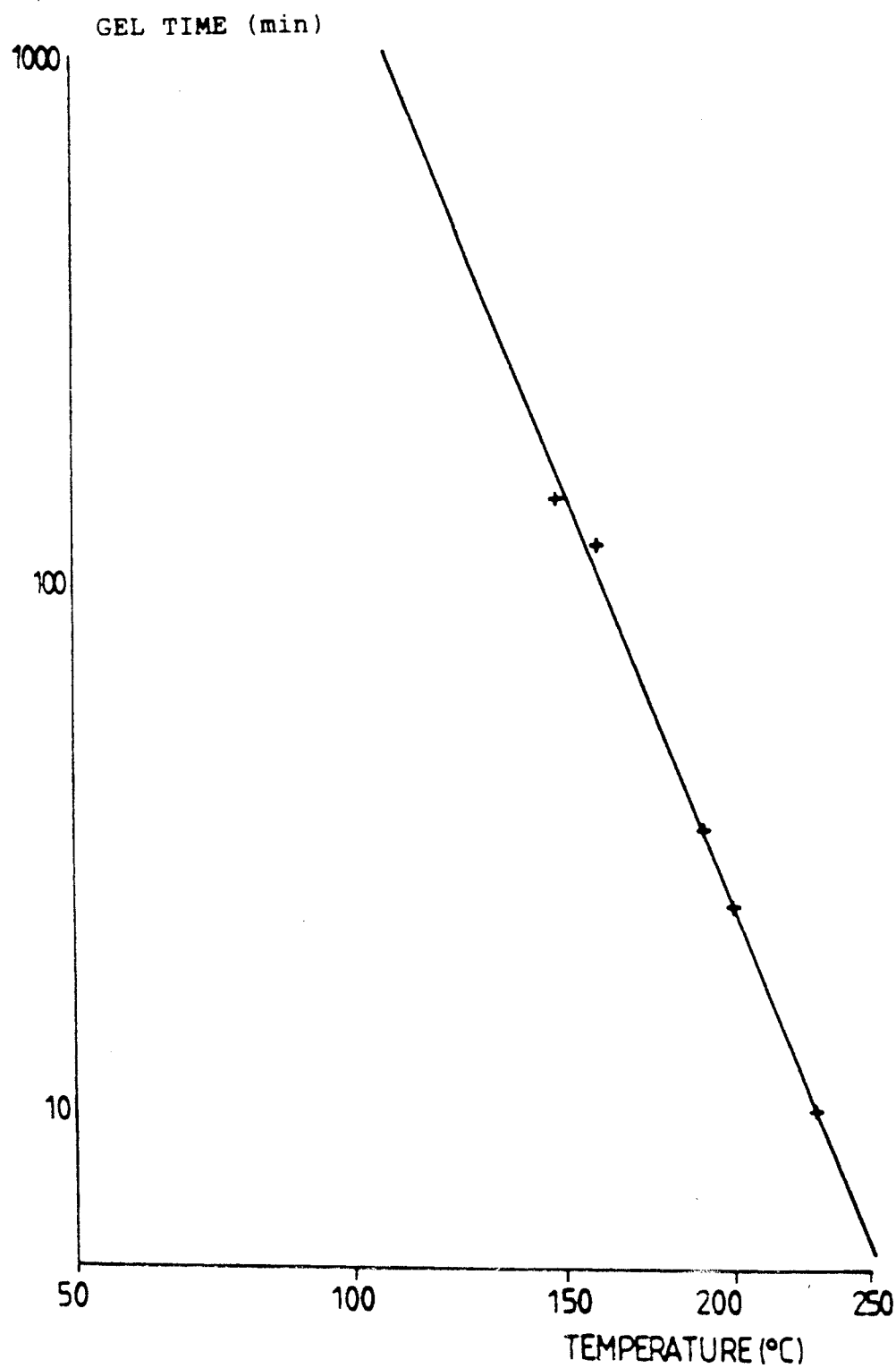

The autoclave is subjected to the temperature/pressure cycle indicated in FIG. 4, the solid line and dotted line curves representing, respectively, the variations in the temperature and pressure as a function of time. At time 0, vacuum is applied through a pipe 22 fitted with a valve 23, in order to establish a residual pressure of less than or equal to $10^{-1}$ Pa. The rise in temperature starts at the end of 2 hours, by means of a thermostat-controlled oil bath 24. The viscosity of the polymer and its gel time, that is to say the time which it requires to achieve, as a result of the crosslinking reaction, a gelled state in which it no longer flows, vary as a function of the temperature in accordance with the curves of FIGS. 5 and 6 respectively, which are plotted in logarithmic coordinates. A temperature of 160° C. corresponds to a viscosity of about 30 centipoise, allowing sufficient impregnation before the gel time. When this temperature is reached, the structure 19 is plunged into the polymer by moving the rod 20. After a 5 min plateau at 160° C., the valve 23 is closed and a controlled nitrogen pressure of 5 MPa is applied through a pipe 25 fitted with a valve 26. After a 115 min plateau at this pressure, the temperature being 160° C. throughout, the temperature is raised again, at a rate of 2° C. per minute, up to 250° C., this temperature being maintained for 90 min. The autoclave is then cooled and then put back to the open air.

At the end of this treatment, the impregnated fibrous structure coated with residual polymer detaches easily from the walls of the reservoir.

Figure 8:
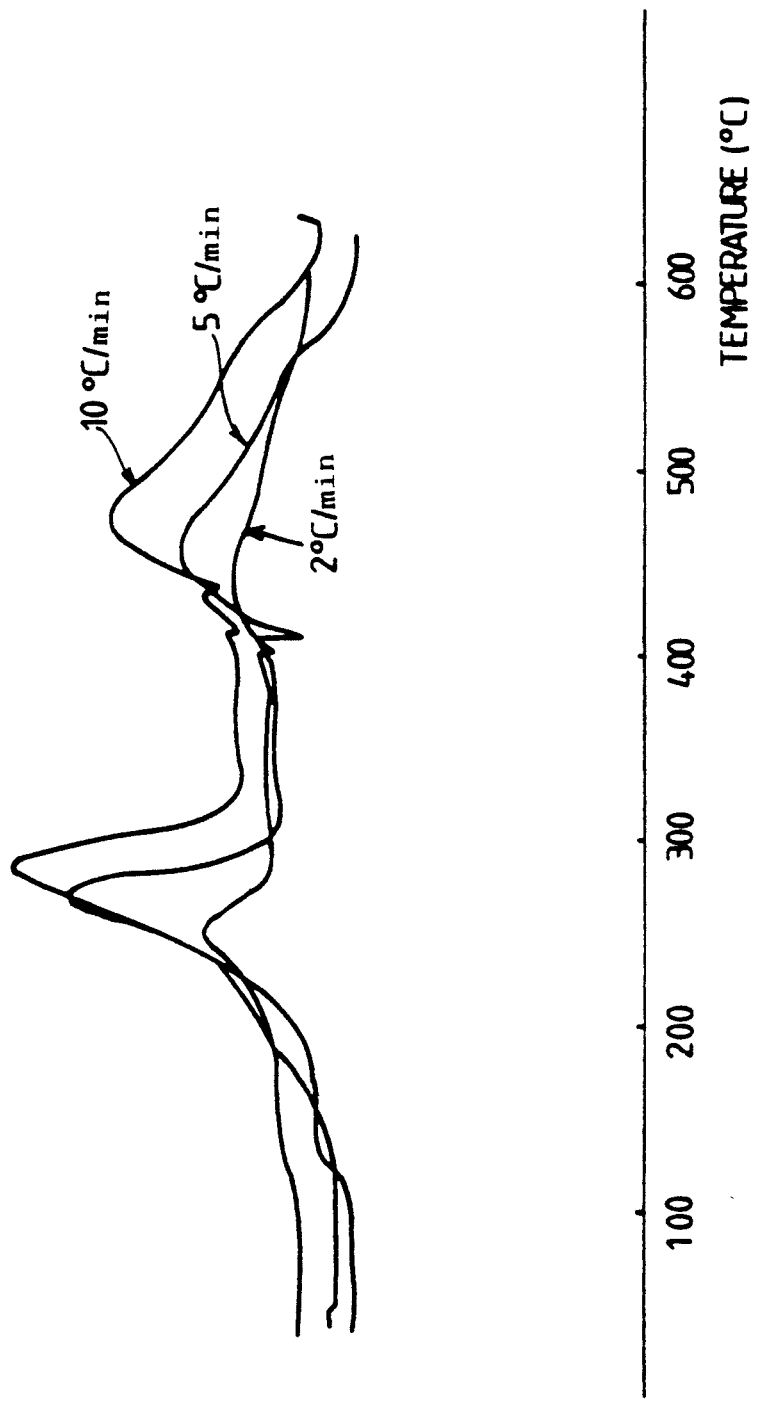

The heat cycle described above is deduced from the differential thermal analysis curves in FIG. 8, which were plotted for three different rates of rise in temperature. The rise in temperature may be rapid (10° C. per minute up to 200° C.). For crosslinking, the rate is reduced to 2° C. per minute up to 250° C., where a plateau is effected.

Figure 7:
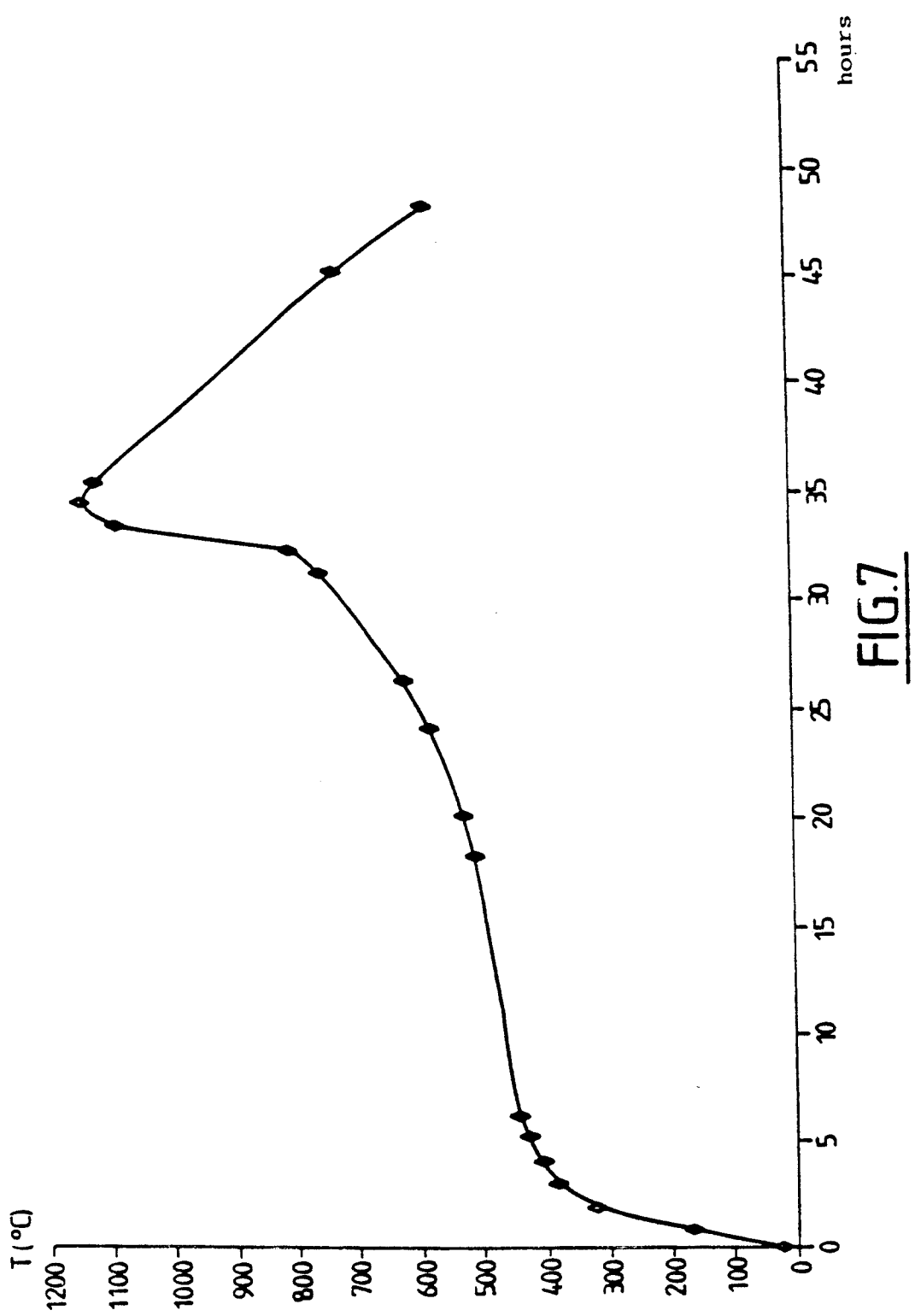
FIG. 7 is a curve showing the variation in the temperature as a function of time for the pyrolysis of this liquid polysilane.

The pyrolysis of the polysilane (sixth stage) takes place in a furnace, while flushing with nitrogen, in accordance with the heat cycle shown by the curve in FIG. 7, as established as a function of the thermogravimetric analysis curves in FIG. 1, so as to prevent too high an instantaneous mass flow of loss of material, which would create mechanical strains in the product. To this end, the temperature was raised up to about 1,150° C. for a period of 34 hours, at a variable rate such that the flow of material is substantially constant and equal to 1%/h relative to the mass of crosslinked polymer. This period could be reduced to 24 hours, the maximum treatment temperature being at least 1,000° C.

Figure 9:
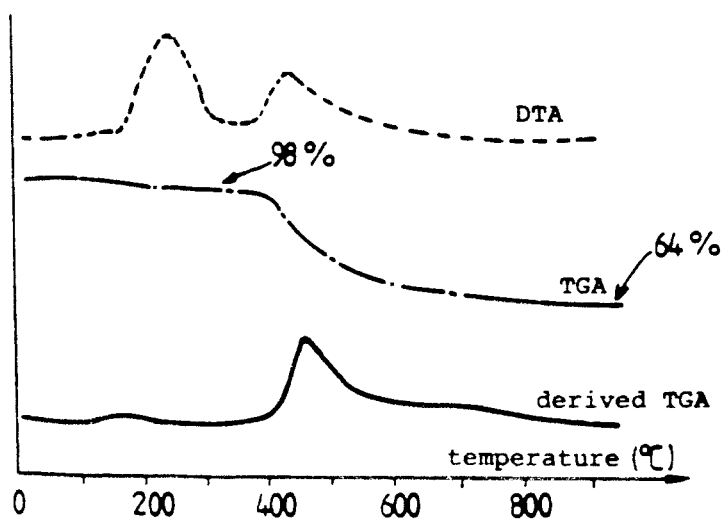
FIGS. 8 and 9 are thermal analysis diagrams of the same polysilane.

FIG. 9 shows three thermal analysis curves for the polysilane: a differential thermal analysis curve, a thermogravimetric analysis curve and a derived thermogravimetric analysis curve, plotted, respectively, as a broken line, a dash-and-dot line and a solid line. In the first of these curves, as in those of FIG. 8, a first peak corresponding to the crosslinking and a second peak corresponding to the pyrolysis are found. On the thermogravimetric analysis curve, the percentages of residual mass are indicated after the crosslinking peak (98% at 300° C.) and after the pyrolysis peak (64% at about 700° C.). It is seen in particular that the crosslinking takes place virtually without loss of mass.

An important characteristic of the silicon carbide obtained is its chemical composition. In general, the silicon carbide obtained by pyrolysis of a polysilane is not pure. It contains a little oxygen in addition to silicon and carbon. Its chemical composition is usually characterized by the mass proportions of SiC, silica and carbon, calculated by arbitrarily assuming that the element silicon is present in the form of SiC and of silica, the element carbon is in the form of SiC and in the free form and the element oxygen is in the form of silica. These proportions are, respectively, 68%, 8% and 24% for the silicon carbide obtained by pyrolysis of the vinylsilane polymer described above, compared with 66%, 17% and 17% for the NICALON fibers. This proportion of carbon may be modified by adjusting the formulation of the starting monomer mixture. In particular, replacement of trimethylchlorosilane by a benzyl halide, as provided in the patent application mentioned above, would further increase the proportion of carbon.

The particular characteristics for the various examples are summarized in Tables 1 and 2.

EXAMPLES 1 TO 6

These examples use a tridirectional fabric of fibers and are the subject of Table 1. These examples differ from one another in respect of the deposition of carbon on the fibers (second stage) and in respect of the filtration conditions (third stage). The apparent densities and the porosities are calculated by measuring the apparent volume of the composite material by immersion in a liquid. The pyrolysis ratios indicated in the table are the ratios between the mass (or the volume) of the silicon carbide obtained by pyrolysis of the liquid polysilane and the mass (or the volume) of the latter. Alongside the breaking strength measured using the three-point bending test, the relative volume occupied in the composite material by the fibers acted upon because of their orientation has been indicated. The test was carried out under the following conditions: dimensions of the test piece: $(1 \times w \times t) 65 \times 5 \times 2.5$ mm, spacing of the support 50 mm, load applied at the middle.

In Examples 1 and 2, the second stage was omitted. The result is too strong a bonding between the fibers and the matrix and a purely brittle fracture (fracture in the straight line part of the strain/deformation curve in elastic regime) without a reinforcing effect of the fibers. By modifying the filtration conditions, different powder apparent densities are obtained for these two examples.

In Example 3, the deposition time in the second stage was brought to 120 min, leading to a carbon thickness of 500 to 700 nanometers. The result is a mediocre impregnation by liquid polysilane due to bridges between the coatings on the various fibers. The residual porosity is high and the apparent density of the final product is low compared with those obtained with a carbon thickness of 200 to 300 nanometers (Examples 4 to 6), produced with a deposition time of 70 min.

In Example 5, the thickness of the filtration mold is larger than in Example 4 (6.5 mm instead of 5.5), which leads to a higher apparent density $d_c$ and a higher apparent density of the final product.

The apparent density $d_c$ is further improved in Example 6, compared with Example 5, by using an acetone slip. However, the properties of the final product are not substantially different.

Examples 7 to 9 are the subject of Table 2, in which some of the characteristics explained in connection with Table 1 are given. An aqueous slip was used in these three examples.

In Example 7, the fabric of fibers is bidirectional. The porosity in the pyrolyzed state is less than that in Example 5, for an equivalent apparent density. For these two examples, the mechanical properties are substantially proportional to the proportion by volume of fibers which are acted upon.

In Example 8, a unidirectional fibrous structure is used as the starting material, which further reduces the porosity in the pyrolyzed state and increases the apparent density. The mechanical properties are slightly poorer, related to the proportion of fibers acted upon.

Example 9 is a comparative example in which the fibrous structure is not used, the slip being filtered for the remander under the same conditions as in the preceding examples. A porosity in the pyrolyzed state and an apparent density which are very close to those of Example 8 are obtained, indicating that the unidirectional fibrous structure permits the production of a matrix having substantially optimum properties.

As can be seen from the above explanation, the invention is not restricted to the production of SiC/SiC composite materials.

Moreover, the long fibers may be replaced by short fibers, optionally mixed with the ceramic powder before producing the fibrous structure. Conversely, this powder may be introduced as a mixture with the liquid precursor into a fabric of fibers, the whole then being subjected to a heat treatment under load.

We claim:

1. A process for the production of a ceramic composite material comprising a fibrous structure of silicon carbide embedded in a matrix, in which process on the one hand discrete particles of ceramic material and on the other hand a liquid substance capable of being converted to ceramic material by heat treatment are introduced into the empty spaces of the fibrous structure and the whole is heated to convert said substance and bind the discrete particles to one another by means of the ceramic material thus obtained, forming a continuous matrix, wherein said liquid substance is a polymer which converts to ceramic material by pyrolysis.

2. The process as claimed in claim 1, wherein a suspension (9) of particles of ceramic material in a liquid carrier is passed through the previously established fibrous structure (6) until the desired volume of particles has been introduced into the empty spaces of the structure, the liquid carrier present in said empty spaces is removed and the liquid substance (21) is then introduced into the volume left free by the particles.

3. The process as claimed in one of claims 1 and 2, wherein the liquid substance is introduced by immersion of the fibrous structure (19) provided with ceramic particles into a bath of said substance (21).

4. The process as claimed in one of claims 1 and 2, wherein the fibrous structure comprises long fibers extending continuously in at least one direction.

5. The process as claimed in one of claims 1 and 2, wherein the matrix consists of silicon carbide and the liquid substance is a liquid polysilane.

6. The process as claimed in claim 5, wherein the polysilane comprises ethylene groups and hydrogen atoms bonded to silicon atoms.

7. The process as claimed in claim 6, wherein the polysilane is a copolymer obtained by reacting two monomers having, respectively, the following formulae:

$$R(CR'_2=CR')SiX_2 \qquad (I)$$

TABLE 1

| | Filtration conditions | | | | Apparent density of the SiC powder in the substrate ($d_c$) | Open porosity (% by volume) after | | Apparent density of the composite material | Pyrolysis ratios | | 3-Point bending test | |
|---|---|---|---|---|---|---|---|---|---|---|---|---|
| | Thickness of the mold (mm) | Slip 200 g/l | | Pressure (MPa) | Time (h) | | | | | | Theoretical proporation by volume of fibers acted upon (%) | Strength (MPa) |
| Ex. | | Medium | Vol. (ml) | | | | Cross-linking | Pyrolysis | | By mass (%) | By volume (%) | | |
| 1 | 5.5 | Aqueous | 100 | 0.7 | 2 | 1.43 ($\eta = 0.92$) | 5.3 | 25 | 2 | 57 | 22 | 20 | 40 ± 10 |
| 2 | 6.5 | Aqueous | 100 | 0.2 | 5 | 1.29 ($\eta = 0.86$) | 1.9 | 25 | 1.98 | 72 | 29 | 20 | 70 ± 20 |
| 3 | 5.5 | Aqueous | 100 | 0.7 | 5 | 1.35 ($\eta = 0.87$) | 12.3 | 31 | 1.77 | 65 | 26 | 20 | — |
| 4 | 5.5 | Aqueous | 100 | 0.7 | 3 | 1.35 ($\eta = 0.87$) | 2.7 | 26 | 2.01 | 72 | 29 | 20 | 150 ± 30 |
| 5 | 6.5 | Aqueous | 120 | 0.7 | 3 | 1.48 ($\eta = 0.98$) | 2.2 | 22 | 2.17 | 65 | 26 | 20 | 240 ± 50 |
| 6 | 6.5 | Acetone | 120 | 0.7 | 3 | 1.65 ($\eta = 0.80$) | — | 20 | 2.14 | — | — | 20 | 250 ± 70 |

TABLE 2

| | Filtration conditions | | | | Open porosity (% by volume) after | | Apparent density of the composite material | 3-Point bending test | |
|---|---|---|---|---|---|---|---|---|---|
| Example | Thickness of the mold (mm) | Volume of slip (ml) | Pressure (MPa) | Time (h) | Cross-linking | Pyrolysis | | Proportion by volume of fibers acted upon (%) | Strength (MPa) |
| 7 | 6.5 | 130 | 0.7 | 3.5 | 2.15 | 13 | 2.20 | 15 | 190 ± 30 |
| 8 | 5 | 120 | 0.7 | 5 | 2.20 | 8 | 2.26 | 45 | 490 ± 50 |
| 9 | 5 | 110 | 0.7 | 3 | 0.70 | 7 | 2.30 | — | 110 ± 25 |

$$RHSiX_2 \quad (II)$$

in which formulae the symbols R represent identical or different hydrocarbon radicals, the symbols X represent identical or different halogen atoms and the symbols R' each represent a hydrogen atom or a hydrocarbon radical, and at least one monohalogenated monomer with sodium, the ratio $r_1$ of the number of moles of the monomer (I) to the number of moles of the monomer (II) being between 2 and 3.3 approximately, and the ratio $r_2$ of the number of moles of the monohalogenated monomer to the number of moles of the monomers (I) and (II) being between 0.2 and 0.8 approximately.

8. The process as claimed in claim 7, wherein the monomers used and their molar fractions are as follows:

| | |
|---|---|
| $CH_3(CH_2=CH)SiCl_2$ | 0.76 |
| $CH_3HSiCl_2$ | 0.24 |
| $(CH_3)_3SiCl$ | 0.40 |

9. The process as claimed in claim 5 wherein the polysilane has a viscosity of less than about 20 poise at ordinary temperature and less than about 1 poise at 100° C.

10. The process as claimed in claim 5 wherein the polysilane is treated at a temperature of about 1,000° C. to obtain silicon carbide.

11. The process as claimed in claim 7 wherein the treatment for the conversion of the polysilane to silicon carbide is preceded by a crosslinking treatment at a lower temperature.

12. The process as claimed in claim 5 wherein the fibers are subjected, before they are brought into contact with the silicon carbide particles and with the liquid polysilane, to a treatment limiting the physicochemical interactions between the fibers and the matrix.

13. The process as claimed in claim 12, wherein the treatment limiting the interactions is a deposition of an intercalary material having anisotropic internal cohesion.

14. The process as claimed in claim 13, wherein the intercalary material is carbon.

15. The process as claimed in claim 5 wherein the silicon carbide particles present in the fibrous structure are subjected, before introduction of the liquid polysilane, to a treatment which improves their wettability by the latter.

16. The process as claimed in claim 15, wherein the hydroxyl groups present at the surface of the particles are removed by the action of a monohalogenated monosilane in the gaseous state.

* * * * *